Dec. 25, 1962

R. C. BAUBLES 3,069,960

SCREW THREADED MEMBER

Original Filed March 7, 1957

INVENTOR.
RICHARD C. BAUBLES
BY
Prangley Baird Clayton Miller & Vogel
ATTYS.

Dec. 25, 1962 R. C. BAUBLES 3,069,960
SCREW THREADED MEMBER
Original Filed March 7, 1957 2 Sheets-Sheet 2

INVENTOR.
RICHARD C. BAUBLES
BY
ATTYS.

United States Patent Office 3,069,960
Patented Dec. 25, 1962

3,069,960
SCREW THREADED MEMBER
Richard C. Baubles, West Orange, N.J., assignor to Elastic Stop Nut Corporation of America, Union, N.J., a corporation of New Jersey
Original application Mar. 7, 1957, Ser. No. 644,548. Divided and this application June 9, 1958, Ser. No. 740,656
7 Claims. (Cl. 85—1)

This invention relates to an externally threaded member, such as a screw, bolt, or other externally threaded stud or article, and to method and apparatus for making the same.

This application is a division of application Serial No. 644,548 filed by me on March 7, 1957, now abandoned.

The fatigue failure of externally threaded members is of grave concern to many industries, particularly the aircraft industry, wherein repeated loading of an externally threaded member commonly causes failure at stress levels which are far below those at which failure could be expected under static conditions.

Fatigue failure of the threaded portion of an externally threaded member has heretofore always begun at the root of the thread.

It has been known for many years that a rolled thread is superior in fatigue strength or fatigue life to a thread formed by other methods, and it has previously been suggested that a thread formed by other methods may be improved in respect to fatigue strength by finish rolling of the thread.

Externally threaded members formed by the thread rolling method are generally superior in fatigue strength to threads formed by other methods and subsequently finish rolled in their crest or root portions. Moreover, finish rolling of the root portions of threads of the common or most popular sizes used on aircraft is not feasible or practical from the standpoint of cost and satisfactory mass production tooling. It is accordingly an object of this invention to provide an externally threaded article having superior fatigue strength or life characteristics and to devise a method and apparatus for making the same.

Another object of the invention is to provide a rolled thread capable of formation in blanks of greater hardness than have heretofore been deemed capable of use for such purpose.

Other and further objects and advantages of the invention will be apparent from the following description when taken with the accompanying drawings in which—

Figure 1:
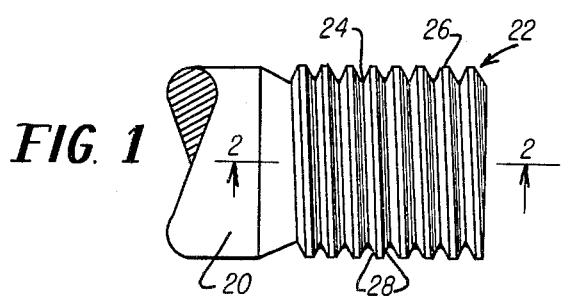
FIGURE 1 is a fragmentary view in elevation of an externally threaded member embodying the invention.

Referring now to FIGURE 1, the member or article 20, such as a screw, bolt, or other externally threaded stud or article, is provided with an external thread 22 having a root 24, a crest 26 and flanks 28.

The thread 22 in form and dimensions corresponds to a typical thread of the Unified, American or National thread form, with a thread angle of 60°, but it is to be understood that the invention is also applicable to external threads of other thread forms.

Figure 2:
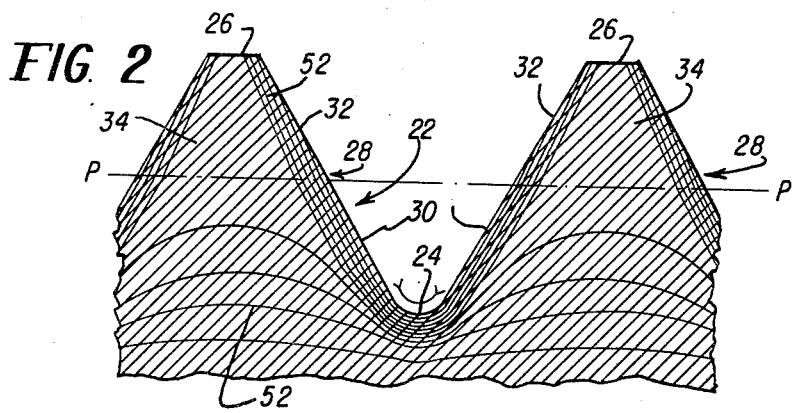
FIGURE 2 is an enlarged, fragmentary view in section taken on the line 2—2 of FIGURE 1.

As shown in FIGURE 2, the root or root portion 24 of the thread 22 is rounded and the crest 26 flat, the root 24 being a rolled or coined surface and the flat 26 a machined surface. Each thread flank 28 comprises a rolled or coined surface portion 30 extending from the root to the pitch cylinder P and ground, or other machined, surface portion 32 extending from the pitch cylinder to the flat 26.

It should be understood that the thread 22 according to this invention is formed on a cylindrical blank portion of a minimum tolerance diameter substantially equal to the pitch diameter for the desired thread size.

In the manufacture of high tensile bolts, the bolt blank is hardened prior to thread rolling to a hardness above 37 Rockwell C and preferably between 42 Rockwell C and 53 Rockwell C, or even higher.

At this point it may be stated that by the practice of this invention it has been found possible to roll threads in material of higher hardness (and consequently higher tensile strength) than has heretofore been capable of accomplishment.

The thread 22 is formed by a sequence of operations consisting of, first, a thread rolling operation to form a rolled or coined thread portion having the root surface 24 and the flank surfaces 30 inwardly of the pitch cylinder P and to form a freely extruded thread portion 34 extending beyond the pitch cylinder P and having free extruded or extrusion surfaces. The thread rolling operation is followed by a cutting or grinding step, or other surface machining operations, simultaneously or sequentially performed, to form the flats 26 and the flank portions or surfaces 32 extending outwardly from the pitch cylinder P.

Figure 3:
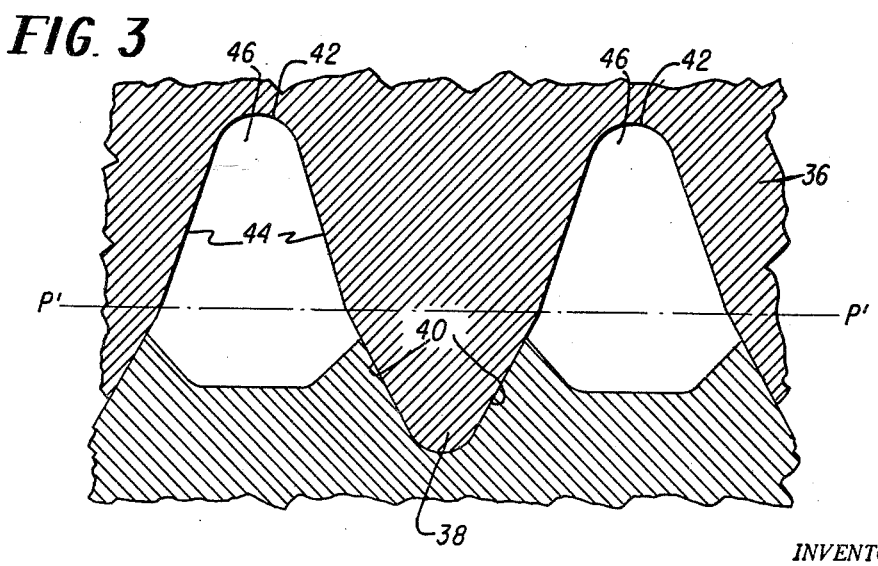
FIGURE 3 is an enlarged fragmentary view in section through the axis of a work piece showing a preferred form of die for making an article embodying the invention, the parts being shown shortly after the die has first engaged the work piece at the start of the rolling operation.
Figure 4:
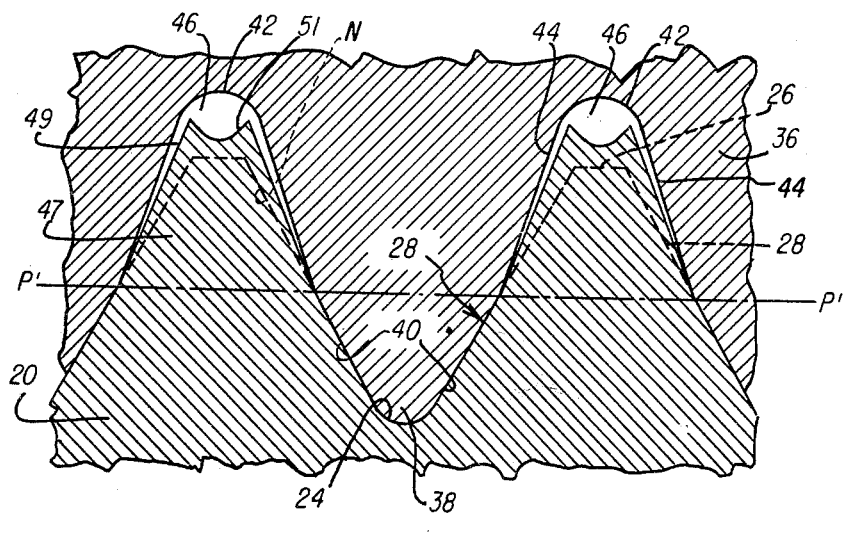
FIGURE 4 is a view similar to FIGURE 3 showing the parts at the end of the rolling operation.

The thread rolling operation may be performed by the usual thread rolling mechanism employing, however, specially formed dies of which the die 36, shown in FIGURES 3 and 4, is illustrative. Each die 36 has a first section including a crest portion 38 and flank portions 40 extending inwardly from the crest portion 38 to the pitch line P' and a second section including a root portion 42 spaced from the crest portion 38 a distance substantially greater than the depth of the thread to be formed by the die and joined by flank portions 44 to the flank portions 40 at the pitch line P'. The included angle between the flank portions 44 is substantially less than the included angle between the flank portions 40 so that an orifice through which the metal may be extruded is formed at the junction of the flank portions 44 with the flank portions 40. The flank portions 44 and root portions 42 thus define a relief cavity or free expansion space 46 which beyond the extrusion orifice, or inwardly of the pitch line P', is greater in volume than the volume of material which will be extruded thereinto by the coining operation of the die upon the surface of the article or blank 20.

The flank portions or surfaces 44 of each die 36 are preferably relatively inclined at an included angle of 29°, each such flank surface being formed preferably at an angle of 75½° to the pitch line P', although it may vary with the composition or nature of the alloys or materials being worked and with variations in size or form of the thread 22. In any event, the angle of inclination of these flank portions 44 to the pitch line P' should be sufficiently great that the flank surfaces 44 do not come into work-shaping, pressure or coining engagement with the surface of the material extruded into the cavity by the coining operation of the die upon the article 20.

During the rolling operation, a plurality of like dies 36 are moved in conventional fashion toward the axis of the article or body 20. Die crest portion 38 is the first part of each die 36 to engage the body 20, followed immediately by flank portions 40. These die portions together exert a coining force on the body 20 to cause the surface thereof to conform in every respect to such portions of the dies. FIGURE 3 shows the relationship of each die 36 to the body 20 at an early stage of the thread rolling operation.

In continuing the thread rolling operation, the dies move material of the body 20 toward the pitch line P' of the die while continuing to coin the surface of the body and confining material of the body 20, as in any coining operation, within the walls of the die. As the dies continue to move inwardly toward the axis of the body 20, the material of the body, which has been displaced outwardly from the original cylindrical surface thereof by the coining portions or surfaces 38 and 40 of the dies, reaches the extrusion orifices at the pitch lines of the dies and thereafter further inward movement of the dies toward the axis of the body 20 causes the material displaced by the coining operation to be freely extruded through those orifices, into the extrusion cavities 46 of the dies, and into shapes determined solely by the extrusion forces exerted on the material by the coining operation of the dies on the metal body 20. Thus when the dies 36 have been moved the required distance toward the axis of the body 20 so that the pitch lines P' of the dies correspond, or substantially coincide, with the pitch cylinder P, i.e., substantially the original cylindrical surface of the body 20, as shown in FIGURE 4, the body 20 has formed therein and therefrom a thread-like portion 47 having the coined root portion or surface 24 for the final thread 22 and the flank portions or surfaces 30 for the final thread 22 inwardly of the pitch cylinder P and also having flank portions or surfaces 49, outwardly of the pitch cylinder P and recessed crests 51. It is to be noted that the flank portions 44 of the die cavities 46 do not exert any work-shaping pressures on the thread 47 or on the flank surface portions 49 of that thread.

During the described coining operation on the body 20, forces are generated within and along the surface of body 20 in a direction parallel to the surface of flank portions 40 of the dies and away from the axis of the body 20. Forces are also generated within and near the surface of the body 20 in a direction perpendicular to and away from the axis of the body. The resultant effect of these forces is to produce an extrusion force causing the material as it is extruded into the cavities 46 of the dies to expand beyond the normal thread form lines indicated by the dashed line N in FIGURE 4 and to which thread from the material would be confined and shaped by the walls of the prior art die cavities. In order to prevent the die portions or surfaces 44 from applying substantial work-shaping pressures to the flanks of the free extrusion portion of the thread 47 beyond the pitch cylinder P and pitch lines P' as aforesaid, it is necessary that such die flank portions be inclined at a greater angle with respect to the pitch line P' than the flank surfaces of such free extrusion portion.

Following the forming of the thread-like form or portion 47 in and from the body 20, the flank surfaces 49 and the crest surfaces 51 are machined, as by a cutting, grinding or other surface machining operation, to the standard thread outline, as in FIGURE 2, and as indicated by the dashed line N in FIGURE 4.

Figure 5:
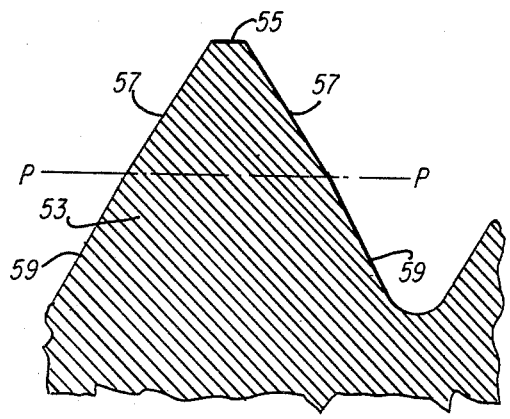
FIGURE 5 is a view in section similar to FIGURE 2 but showing a further form of external thread.

In FIGURE 5 there is shown a thread 53 embodying the invention. Like thread 22, thread 53 may be made from thread 47. Thread 53 has a crest 55 of the same major diameter as crest 26 of thread 22. The pitch cylinder of thread 53 is also indicated by line P—P. Thread 53 has flank portions 57 further from the axis of thread 53 than pitch cylinder P—P and flank portions 59 closer to the axis of the thread 53 than pitch cylinder P—P. Flank portions 57 make a smaller angle with the axis of thread 53 than do flank portions 59. The included angle between flank portions 57 is preferably on the order of 70°. Thus outwardly of pitch cylinder P—P thread 53 is thinner than thread 22 at corresponding distances from the thread axis. Thread 53 has the advantage in that it may be more readily formed from thread 47 by presently available machining tools than thread 22.

The hardened body 20 prior to threading is characterized by grain structure flow lines indicating fiber orientation and extending predominantly parallel to the axis of the body. On completion of the thread 22 by the methods herein disclosed, the flow lines near the surface of the body 20 and throughout the thread 22 follow the paths indicated by the lines 52 in FIGURE 2. These flow lines 52, indicative of grain structure, follow generally the contour of the thread 22 and show a highly compressed grain structure at the root of the thread; a parallel grain structure at and near the coined surfaces 30 and nonparallel grain structures intersecting the machined surfaces 32 at a slight angle and intersecting the machined surfaces of the flat 26 at a sharp angle, whereas in prior rolled threads the grain structure is uninterrupted. Comparative fatigue tests of bolts having standard rolled threads and bolts provided with the external thread 22 of FIGURE 2 show a remarkable improvement in fatigue characteristics in favor of the thread 22. Such comparative fatigue tests showed, for example, that the average cycles to failure of a ⅜-24 thread of a 180 k.s.i. bolt tested at a stress level of 120,000 p.s.i. had been increased, on the average over 3 times, and when tested at a stress level of 83,000 p.s.i. had been increased on the average, over twenty times and that the average cycles to failure of a 220 k.s.i. bolt was increased, on the average, from thirty to two hundred times for a wide range of stress levels.

For highest fatigue strength or life, it is essential that at and near the root surface of an external thread, where the tensile stress under applied load will be greatest, a residual stress be induced which is compressive rather than tensile. The higher the residual compressive stresses at and near the root surface, the greater will be the fatigue strength or life because the greater the residual compressive stresses at and near the root surface the less the probability of a tensile fatigue crack. Hence, the externally threaded article will be able to withstand for a longer time or for more cycles of loading the failure-causing tensile stresses exerted generally axially of the threaded article.

The present invention achieves a substantial increase in the residual compressive stress of the thread root area. The theoretical reason for this increase and the resultant improvement in fatigue characteristics appears from the following analysis.

In the case of a thread rolled in accordance with the hitherto accepted standard practice, all surfaces of the external thread including the flank and crest surfaces outwardly of the pitch cylinder, or the external cylindrical surface of the blank, are coined by the forming pressure of the die crest surfaces and the surfaces of the die cavities, including the die cavity surfaces inward of the pitch lines of the dies. The coining of the flank and root surfaces of the thread inwardly of the pitch cylinder tends to create desirable compressive stresses at the root 24 while the coining of the surfaces outwardly of the pitch cylinder if performed according to standard practice tends to reduce the magnitude of the residual compressive stresses at the root.

Since in the formation of the thread 22 the thread portion 34 outwardly of the pitch cylinder is freely extruded and the flank and crest surfaces of that extruded portion of the thread are not formed by a coining operation, but by cutting, grinding, or other surface machining operations, compressive or back pressure stresses are not created in the extruded portions 34 and, therefore, the advantageous residual compressive stresses created by the coining of the flank and root surfaces inwardly of the pitch cylinder are not diminished and remain at the maximum value in the finished part.

In view of the well known fact that the heat treatment of a threaded member removes previously induced residual stresses, and may induce new largely uncontrollable, residual stresses, it is essential to the securement of the benefits of this invention that the member, body or article to be threaded be hardened prior to the thread forming operation.

The forming of the external thread 22 according to the methods herein disclosed causes a substantial increase in the hardness of the coined surfaces 24 and 30 of the member or article, as for example, from a blank hardness of 42 Rockwell C to about 50 Rockwell C, while the hardness of the remaining surfaces, as for example the crest surface, is substantially unaffected.

Measurements made, by the standard three-wire method of measuring pitch diameter in order to determine changes in the pitch diameter resulting from release of the residual stresses at the root of the thread for a standard rolled thread and for the thread 22 have established that the residual compressive stresses at the root of the thread 22 are remarkably greater than any residual compressive stress at the root of any standard thread.

For some usages, the final machining of the flank surfaces outward of the pitch cylinder, and/or the final machining of the crests, may be eliminated.

This invention also enables threads to be formed on harder blanks than has heretofore been possible. Thus, with methods of the prior art it may be possible to roll threads on blanks of a maximum hardness of about 47 Rockwell C, whereas by this invention threads can be rolled on blanks of a hardness up to 52 or 53 Rockwell C, and even higher. This means that parts of considerably higher ultimate tensile strength can be produced by the practice of this invention than has heretofore been possible.

While there have been illustrated and described herein the preferred embodiments of an external thread embodying the invention, and of methods and apparatus for making such thread, it will be appreciated that this has been done to enable those skilled in the art to appreciate and practice the invention, the true scope of which is indicated by the appended claims.

What is claimed is:

1. The method of forming an external thread in a metal body, comprising the steps of coining the surface of the body into the form of the final root surface and the final flank surfaces of the desired thread inwardly of the pitch cylinder of such thread and simultaneously and substantially freely extruding the material of said body outwardly from within the pitch cylinder through an orifice to form the sections of the desired thread beyond the pitch cylinder without substantial work-shaping pressures.

2. An externally threaded article of which the external thread comprises a coined root, and coined flank surfaces inwardly of the pitch cylinder and a portion simultaneously and substantially freely extruded through an orifice and having machined surfaces extending outwardly from the pitch cylinder.

3. An externally threaded article of which the external thread comprises a coined root and coined flank surfaces inwardly of the pitch cylinder and a portion simultaneously and substantially freely extruded through an orifice and having machined surfaces extending outwardly from the pitch cylinder, said thread having a predetermined thread angle inwardly of said pitch cylinder and a predetermined greater thread angle outwardly of said pitch cylinder.

4. An externally threaded article of which the external thread includes rolled sections inwardly of the pitch cylinder of the thread and sections simultaneously and substantially freely extruded through an orifice and extending outwardly from the pitch cylinder.

5. A work hardened metal stud formed from a metal blank prehardened to a predetermined hardness and having an external thread comprising coined sections inwardly of the pitch cylinder and sections simultaneously and substantially freely extruded through an orifice and extending outwardly from the pitch cylinder, the root of the thread being substantially harder than the crest of the thread.

6. The method of forming a high fatigue life, externally threaded metal body comprising the steps of rolling a helical groove in a cylindrical prehardened body of a minimum external diameter substantially equal to the pitch diameter of the desired thread until the bottom of the groove is of the desired root diameter and adjacent flank surfaces of the groove at the desired thread angle while simultaneously and substantially freely outwardly extruding from the body between adjacent flank surfaces and through an orifice outer thread portions having extrusion crest surfaces and extrusion flank surfaces extending from the rolled flank surfaces of the groove at an included angle substantially less than the desired thread angle and for a distance from the bottom of the groove greater than the desired thread height, and thereafter surface machining the extrusion crest surfaces and the extrusion flank surfaces to the desired thread crest diameter and thread angle.

7. A work hardened metal stud formed from a prehardened metal blank and having an external thread comprising a rolled helical groove within an imaginary cylinder of a diameter substantially equal to the pitch diameter of the desired thread and sections outside said cylinder simultaneously extruded through an orifice and shaped by surface machining operations to the desired crest diameter and thread angle.

References Cited in the file of this patent

UNITED STATES PATENTS

| | | |
|---|---|---|
| 1,865,575 | Locke | July 5, 1932 |
| 2,011,761 | Handel | Aug. 20, 1935 |
| 2,150,876 | Caminez | Mar. 14, 1939 |
| 2,335,590 | Gersman | Nov. 30, 1943 |
| 2,364,442 | Hoern | Dec. 5, 1944 |
| 2,514,589 | Penman | July 11, 1950 |
| 2,656,740 | Bedker | Oct. 27, 1953 |
| 2,679,774 | MacDonald | June 1, 1954 |
| 2,690,089 | Bedker | Sept. 28, 1954 |
| 2,699,077 | Bedker | Jan. 11, 1955 |
| 2,750,034 | Gersman | June 12, 1956 |

FOREIGN PATENTS

| | | |
|---|---|---|
| 564,269 | Great Britain | Sept. 20, 1944 |
| 751,103 | Germany | Sept. 22, 1952 |

OTHER REFERENCES

An Investigation of the Laws of Plastic Flow, Scientific Paper No. 278 by Eugene C. Bingham, Bureau of Standards Bulletin, volume 13, 1917, QC 1 U5.

The Extrusion of Metals, Pearson, chapter 5, pages 98–113, published by John Wiley and Sons Inc., 1953.

American Machinist, page 154, July 9, 1951.